Dec. 26, 1933.     I. H. ATHEY     1,940,835
TRUSS WHEEL CONSTRUCTION
Filed Oct. 1, 1928     4 Sheets-Sheet 1

Inventor
Isaac H. Athey
By Williams, Bradbury,
McCaleb & Hinkle
Attys.

Dec. 26, 1933.   I. H. ATHEY   1,940,835
TRUSS WHEEL CONSTRUCTION
Filed Oct. 1, 1928    4 Sheets-Sheet 4

Inventor
Isaac H. Athey
By Williams, Bradbury, McCaleb & Hinkle
Attys.

Patented Dec. 26, 1933

1,940,835

UNITED STATES PATENT OFFICE 1,940,835

TRUSS WHEEL CONSTRUCTION

Isaac H. Athey, Chicago, Ill., assignor to Athey Truss Wheel Co., Chicago, Ill., a corporation of Illinois Application October 1, 1928. Serial No. 309,415

12 Claims. (Cl. 305—10)

This invention relates to improvements in vehicles and is particularly concerned with the improvements in the running gear of that type of vehicle in which the load supporting wheels run upon an endless track chain which passes around the wheels.

An object of the invention is to provide an improved running gear for a vehicle.

A further object is to provide a heavy duty running gear for a vehicle having an endless track chain upon which the wheels of the vehicle are supported, the portion of the endless track between the wheels being supported by trusses to form a tread surface for the wheel which is capable of being folded around a comparatively small wheel.

A further object is to provide an endless track chain for supporting the wheels of the vehicle in which trusses are provided having long truss arms to support the tread members between the wheels under a heavy load without undue strain upon the trusses.

A further object of the invention is to provide an endless track chain for supporting the wheels of the vehicle, the track chain having trusses which support the tread members of the track chain between the wheels of the vehicle and which are connected by a plurality of endless chain mechanisms to provide a sturdy construction which is capable of collapsing around a wheel of small diameter.

A further object is to provide an endless track chain having tread members which are provided with alternately long and short truss members, the long truss members being substantially twice as long as the short truss members, thereby increasing the effectiveness of the trusses without appreciably affecting the collapsibility thereof as it passes around the wheel.

Other objects and advantages of the apparatus will appear as the description proceeds.

Figure 1:
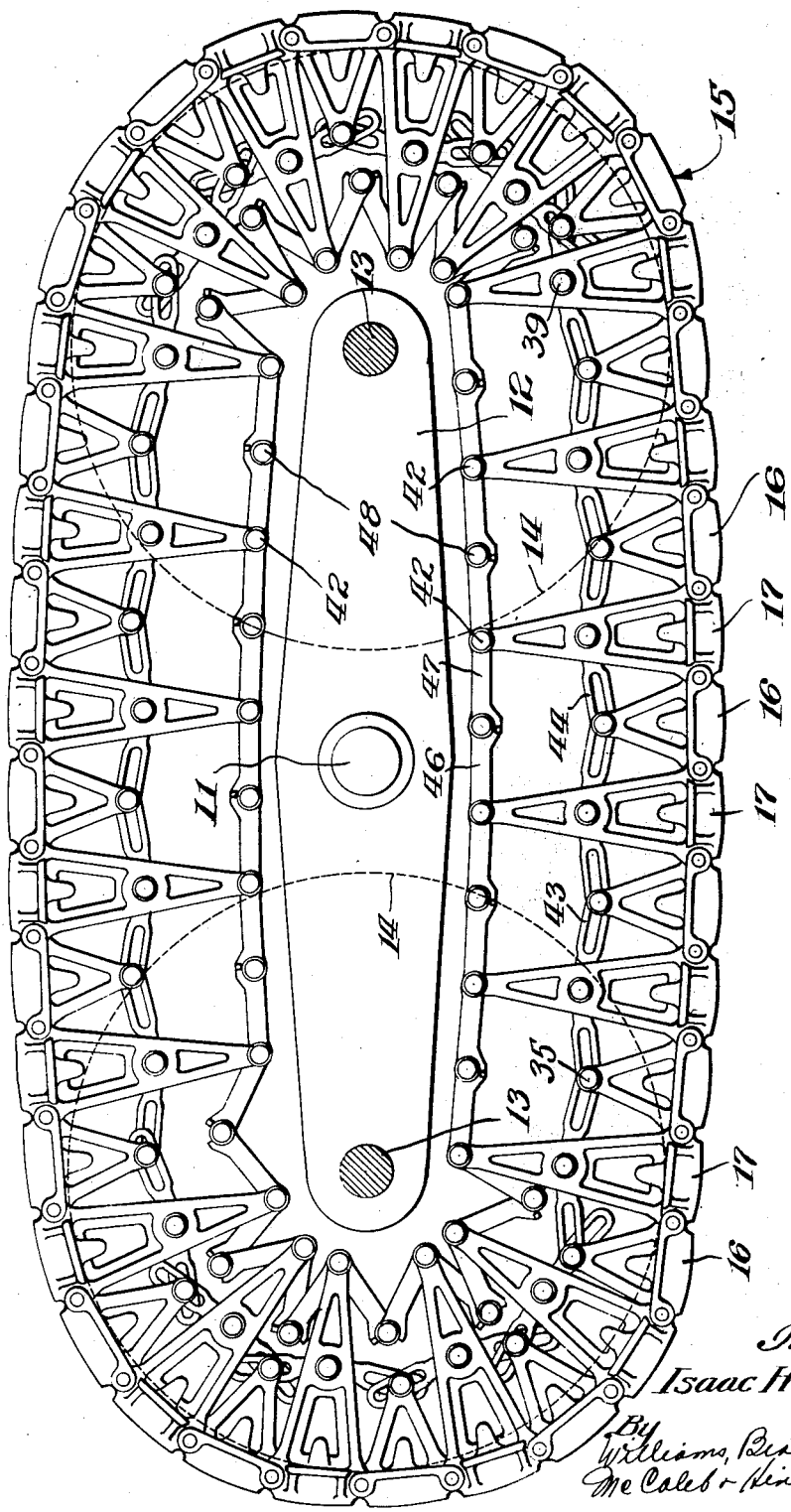
Fig. 1 represents a side elevation of a running gear embodying the invention, with parts broken away to show the truss arms collapsed around the wheeel.
Figure 2:
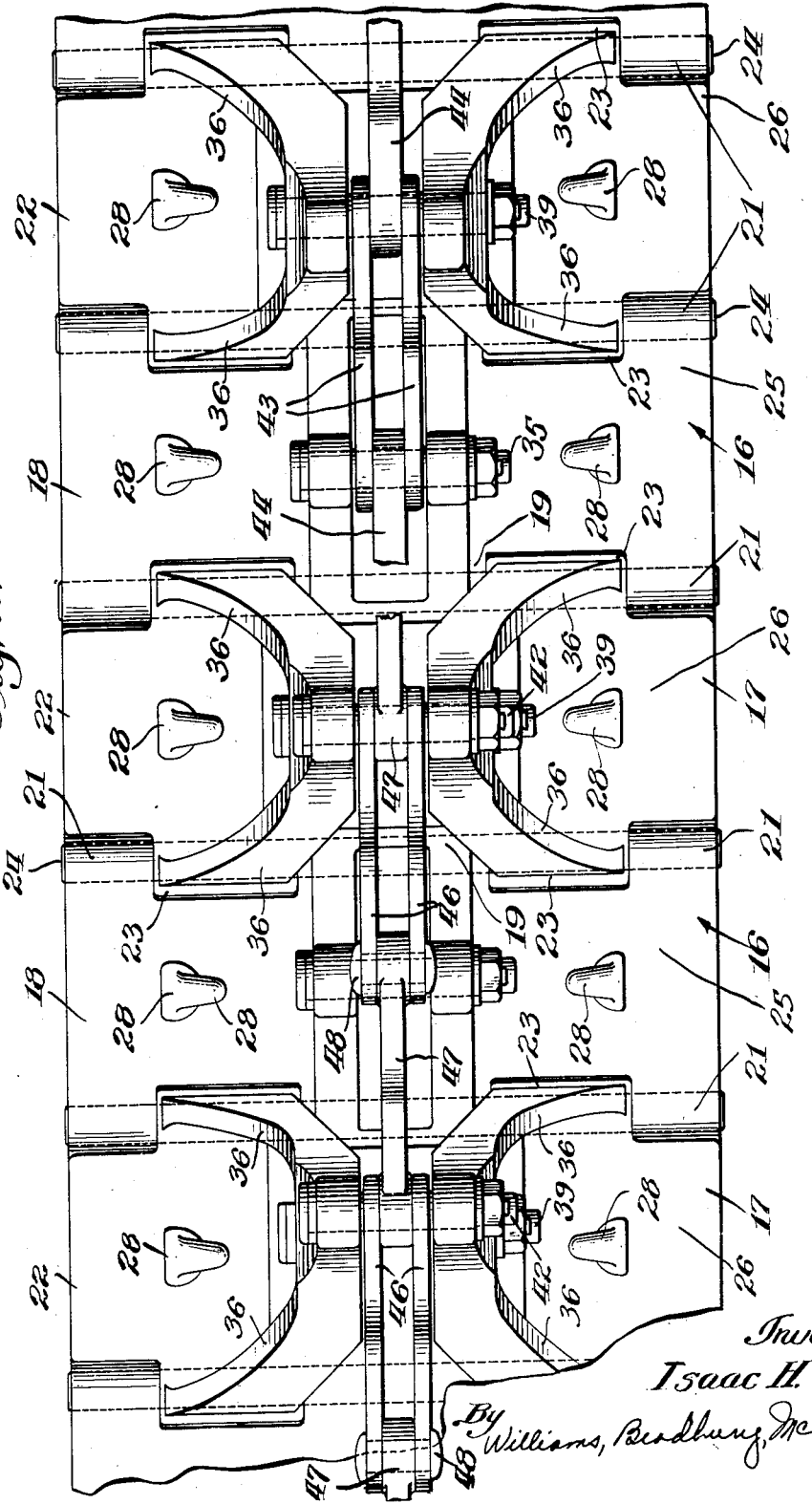
Fig. 2 is an enlarged inner plan view of a portion of an endless track.

Referring to the drawings, in which the same reference characters indicate similar parts in the several views, the invention is shown as being embodied in a vehicle comprising a load supporting axle 11, upon which a beam 12 is pivotally mounted. A shaft 13 is journaled in each end of the beam so that its ends project from each side thereof. A load supporting wheel 14 is secured to each of the projecting ends of the shafts 13.

An endless chain 15 passes around the wheels and comprises a plurality of shoes 16 and 17. Shoes 16 comprise tread members 18 which are provided at each end with a central bearing lug 19 and a pair of side bearing lugs 21 in alignment therewith.

Shoes 17 comprise tread members 22 having bearing lugs 23 at each end thereof which lie adjacent the bearing members of shoes 16 and are hingedly interconnected by pintles 24 which pass through apertures in the bearing lugs of adjacent shoes 16 and 17.

All shoes 16 each have at each side a ledge 25 which is integral with the tread member and is supported at its ends by bearing lugs 21. All shoes 17 each have a similar ledge 26 along each side which is integral with the tread member of the shoe and is supported at its ends by brackets 27. Ledges 25 and 26 form track surfaces upon which the wheels 14 may roll, and the shoes are provided with lugs 28 upon their inner surfaces adjacent the ledges for the purpose of guiding the wheels upon the track.

Extending inwardly from the tread member of each shoe 16 is a pair of triangular shaped truss arms 31 which have a central web 32 surrounded by flanges 33. Flanges 33 rest upon bearing lugs 19 and converge toward the apex of the triangle. This construction provides a strong and sturdy shoe in which the base of the triangular truss arms is substantially as long as the shoe, including the bearing lugs at the ends of the shoe.

A tie bar 34 connects the truss arms 31 of the shoe 16 to increase the strength of the truss arms with regard to lateral stresses. The inner ends of truss arms 31 are provided with apertures adapted to receive pivot pins 35.

Shoes 17 are provided with inwardly extending truss arms 36 which are approximately twice as long as truss arms 31 of shoes 16. Truss arms 36 rest at their bases upon bearing lugs 23 and converge towards the center of the shoes and towards each other. A web 37 having a central opening extends along the interior of each truss arm 36 and along the base of the triangle formed by a pair of arms 36. Intermediate their height each pair of adjacent truss arms has a boss 38 provided with an aperture and adapted to support a pivot pin 39 and above the boss the arms 36 are connected by a web 41. At the inner ends of arms 36 an aperture is provided for carrying a second pivot pin 42.

Figure 3:
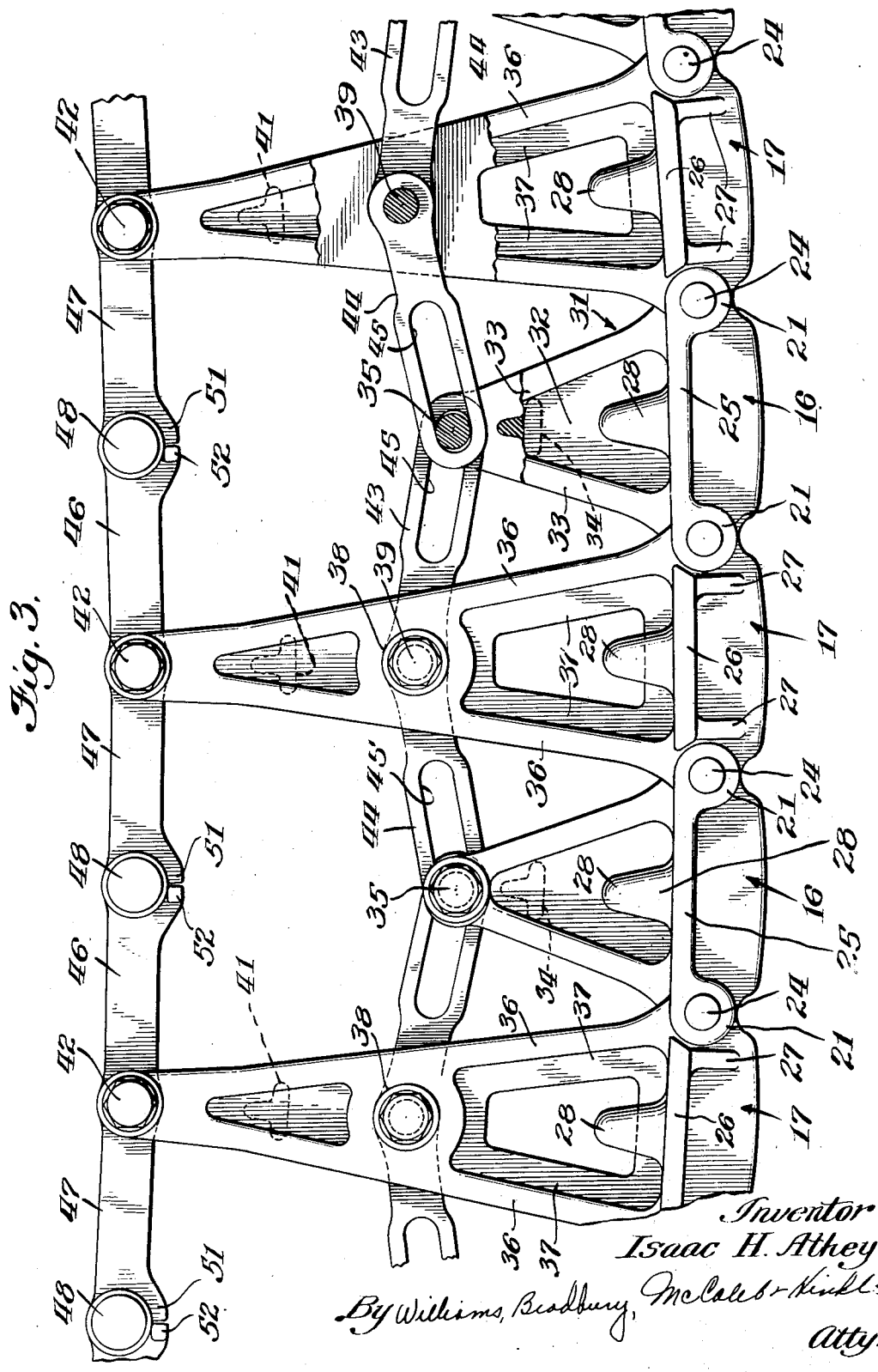
Fig. 3 is a side elevation of the portion of the chain shown in Fig. 2, parts being broken away in section to show other parts.
Figure 4:
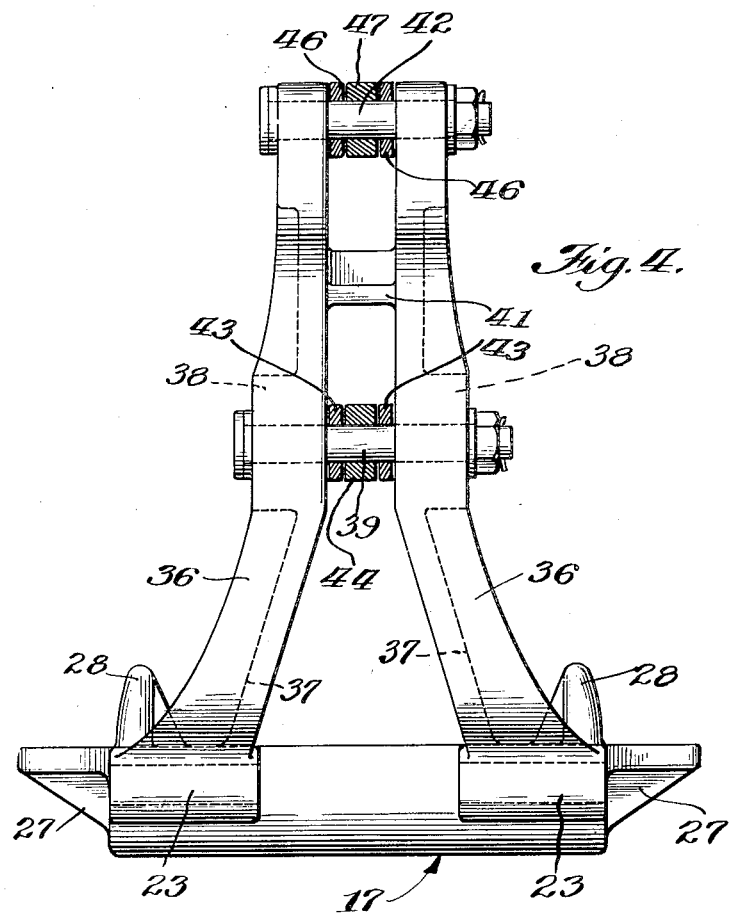
Fig. 4 is an end elevation of one type of shoe used in the endless chain, with the connecting links shown in cross-section.
Figure 5:
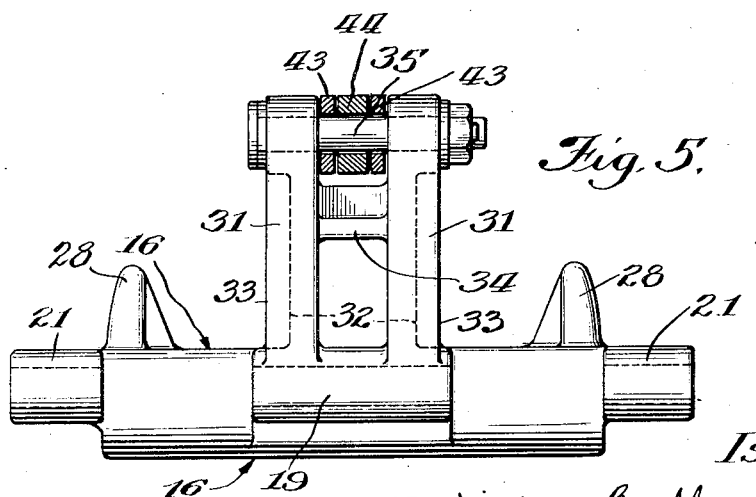
Fig. 5 is an end elevation of another type of shoe which is adapted to adjoin and cooperate with the shoe shown in Fig. 4 to form an endless chain, the connecting links being shown in cross-section.

Pins 39 each pivotally support a pair of links 43 and a link 44, all of which are provided with slots 45. Links 43 as viewed in Fig. 3 extend to the right and the slots 45 thereof are engaged by pivot pins 35 carried by shoes 16. Links 44 extend to the left and their slots 45 engage pivot pins 35 of the shoes 16. The links 43 and 44 thus interconnect all of the shoes 16 and 17 and form an endless chain connection between them. The pivot pins 42 of shoes 17 each pivotally support a pair of links 46 and a link 47. The links 46 of each of the shoes 17 are pivotally interconnected by a pivot pin 48 with the link 47 of an adjacent shoe 17.

Links 47 are each provided with a lug 51 and links 46 are each provided with a transverse lug 52. These lugs cooperate to prevent the links 46 and 47 from forming a straight angle so that the truss arms of successive shoes 17 may always pivot toward each other and the links 46 and 47 will never be on dead center. Links 46 and 47 thus form a second endless chain interconnecting the long truss arms of all of the shoes 17.

As illustrated in Fig. 1, the shoes 16 and 17 form a rigid supporting surface between the wheels carried by the beam 12. The strength and rigidity of this supporting surface is to a certain extent a function of the length of the truss arms. While it is therefore desirable to make the truss arms as long as possible, the length of the arms reduces the radius within which the chain may collapse. In the apparatus just described, the strength and rigidity of the chain is very high and yet the chain is collapsible within a comparatively short radius.

Considering that the vehicle shown in Fig. 1 is moving toward the left, the truss arms of a shoe 17 have just assumed their operative position and the wheel is moving onto the shoe 16 to the left thereof. The pivot pin 35 of this shoe 16 engages the end of the slot of the link 44 and thus this shoe 16 has already become a portion of the rigid supporting surface. When the following shoe 17 is moved to its operative or supporting position, links 43 and 44 will become ineffective and the entire trussing effect will be due to links 46 and 47 and the long truss arms of shoe 17. Slots 45 of links 43 and 44 are made long enough that pivot pins 35 will engage the slots loosely after links 46 and 47 become effective.

This construction provides a strong heavy duty track for a vehicle without unduly increasing the size of the tread members or of the wheels to be used therewith.

Having described the nature and embodiments of my invention, what I desire to secure by United States Letters Patent is as follows:

1. A track chain for a vehicle comprising a plurality of tread members pivotally interconnected to form an endless chain, a truss member for each alternate tread member having a bearing member intermediate its length and a bearing member at its inner end, a link mechanism interconnecting said alternate truss members, intervening truss members each having a single bearing member at its inner end, and a link mechanism for interconnecting the bearings at the ends of the intervening truss members with the intermediate bearings of the alternate truss members.

2. A track chain for a vehicle comprising a plurality of tread members interconnected to form an endless chain, a truss member extending inwardly from each tread member, a link mechanism interconnecting alternate truss members and a second link mechanism interconnecting all of the truss members.

3. A track chain for a vehicle comprising a plurality of tread members pivotally interconnected to form an endless chain, truss arms extending inwardly from said tread members, the truss arms of alternate tread members being of greater length than the truss arms of intervening tread members, a pair of links pivotally attached to each of the truss arms of greater length, said links being interconnected to form an endless chain, a second pair of links pivotally attached to each of the truss arms of greater length intermediate their length, the links attached intermediate the length of the truss arms having slots at their opposite ends, and means carried by the intervening truss arms engaging the slots in said links forming a second endless chain.

4. A track chain for a vehicle comprising a plurality of tread members hingedly interconnected to form an endless chain, alternately long and short truss arms attached to said tread members, a pair of links pivotally attached to the ends of each of the long truss arms, the links of each arm being pivotally connected to links of adjacent long arms, a second pair of links pivotally attached to each of the long arms, said second pair of links having slots at their opposite ends, and bearing pins carried by the short truss arms engaging the slots in the links of the adjacent long truss arms, said links and truss arms forming a truss for maintaining the tread members rigid under the load of the vehicle and allowing them to fold around a wheel of comparatively small diameter.

5. An endless track chain for a vehicle comprising alternate shoes of a different construction hingedly interconnected to form an endless chain, shoes of one type having longer truss arms than shoes of the other type, a link mechanism interconnecting the longer truss arms, pairs of links pivotally connected to the longer truss arms intermediate the length of said arms, said links having longitudinal slots at their opposite ends, bearing pins carried by the shorter truss arms engaging the slots of the links of the longer truss arms, said slots having such a length that when the links connecting the longer truss arms are taut the bearing pins engage the ends of the slots loosely.

6. An endless supporting track chain for vehicles, including track shoes of alternate construction, one form of track shoe provided with a long truss member, the second form provided with a short truss member, links connecting at their inner ends the long truss members, and links connecting the shorter truss members with the long truss members intermediate their length to form a double link arrangement to support the track shoes.

7. A track chain for a vehicle, comprising a plurality of shoes of alternate types, each shoe having a tread member, the edges of the adjacent tread members being pivotally connected, one type of shoe provided with a truss arm extending inwardly from each side of each end of said shoe, said arms converging toward each other and being secured together at their inner ends, the other type of shoe being provided with short truss members, means connecting the adjacent long truss members, and means connecting said short truss members with said long truss members intermediate their length to form a double support for said track shoes.

8. An endless traction chain including a plurality of pivotally connected tread members each having an inwardly extending arm, and a truss chain to which the ends of the arms are connected, said truss chain including a plurality of pairs of links, a pair of links being positioned between adjacent arms, means connecting the ends of adjacent pairs of links to the arms, means connecting the links of each pair, and means formed on said links adapted to at all times hold the last mentioned connecting means out of alignment with the first mentioned connecting means.

9. An endless traction chain including a plurality of pivotally connected tread members each having an inwardly extending arm, and a truss chain to which the ends of the arms are connected, said truss chain including a plurality of pairs of links, a pair of links being positioned between adjacent arms, means connecting the ends of adjacent pairs of links to the arms, and means connecting the links of each pair, one of the links of each pair having a portion engageable with the other link to at all times hold the last mentioned connecting means out of alignment with the first mentioned connecting means.

10. An endless traction chain including a plurality of pivotally connected tread members each having an inwardly extending arm, and a truss chain to which the ends of the arms are connected, said truss chain including a plurality of pairs of links, a pair of links being positioned between adjacent arms, means connecting the ends of adjacent pairs of links to the arms, and means connecting the links of each pair, one of the links of each pair having a laterally extending projection engageable with the other link to at all times hold the last mentioned connecting means out of alignment with the first mentioned connecting means.

11. A track chain for a vehicle comprising a plurality of track shoes interconnected to form an endless chain, a truss member extending inwardly from each track shoe, a linkage connecting alternate truss members in series, a second linkage connecting adjacent truss members in series, the effective lengths of the linkage elements being correlated so that the first said linkage takes the strain between the truss members to which it is connected when the shoes carrying said truss members are in rigid load supporting position, relieving the second said linkage connecting said alternate truss members to the intermediate truss members from strain.

12. A track chain for a vehicle comprising a plurality of track shoes interconnected to form an endless chain, a truss member extending inwardly from each track shoe, a linkage connecting alternate truss members in series, a second linkage connecting each of said truss members to an adjacent truss member, the effective lengths of the linkage elements being correlated so that an angular movement is permitted by the last said linkage between the truss members to which it is connected which is greater than half that permitted by the first said linkage between said alternate truss members.

ISAAC H. ATHEY.